2 Sheets—Sheet 1.

G. N. HORTON.
MILK-COOLER.

No. 181,939. Patented Sept. 5, 1876.

WITNESSES
Thomas Bernard
C. M. Searle

INVENTOR
George N. Horton
Gilmore, Smith & Co.
ATTORNEYS.

N. PETERS, PHOTO-LITHOGRAPHER, WASHINGTON, D. C.

2 Sheets—Sheet 2.
G. N. HORTON.
MILK-COOLER.
No. 181,939. Patented Sept. 5, 1876.
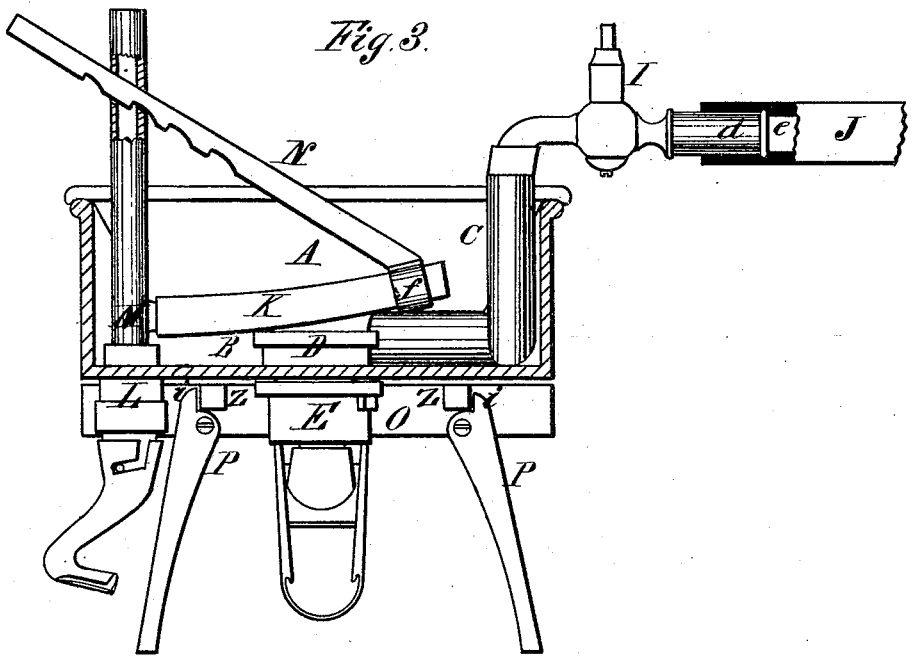
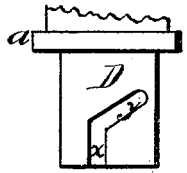
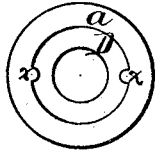
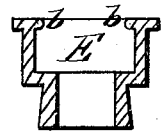
WITNESSES
Thomas Bernard
C. R. Searle
INVENTOR.
George N. Horton.
Gilmore, Smith & Co.
ATTORNEYS

UNITED STATES PATENT OFFICE.

GEORGE N. HORTON, OF BINGHAMTON, NEW YORK, ASSIGNOR OF ONE-HALF HIS RIGHT TO S. S. HORTON, OF SAME PLACE.

IMPROVEMENT IN MILK-COOLERS.

Specification forming part of Letters Patent No. 181,939, dated September 5, 1876; application filed April 1, 1876.

*To all whom it may concern:*

Be it known that I, GEORGE N. HORTON, of Binghamton, in the county of Broome and State of New York, have invented a new and valuable Improvement in a Milk and Cheese Pan; and I do hereby declare that the following is a full, clear, and exact description of the construction and operation of the same, reference being had to the annexed drawings, making a part of this specification, and to the letters and figures of reference marked thereon.

Figure 1:
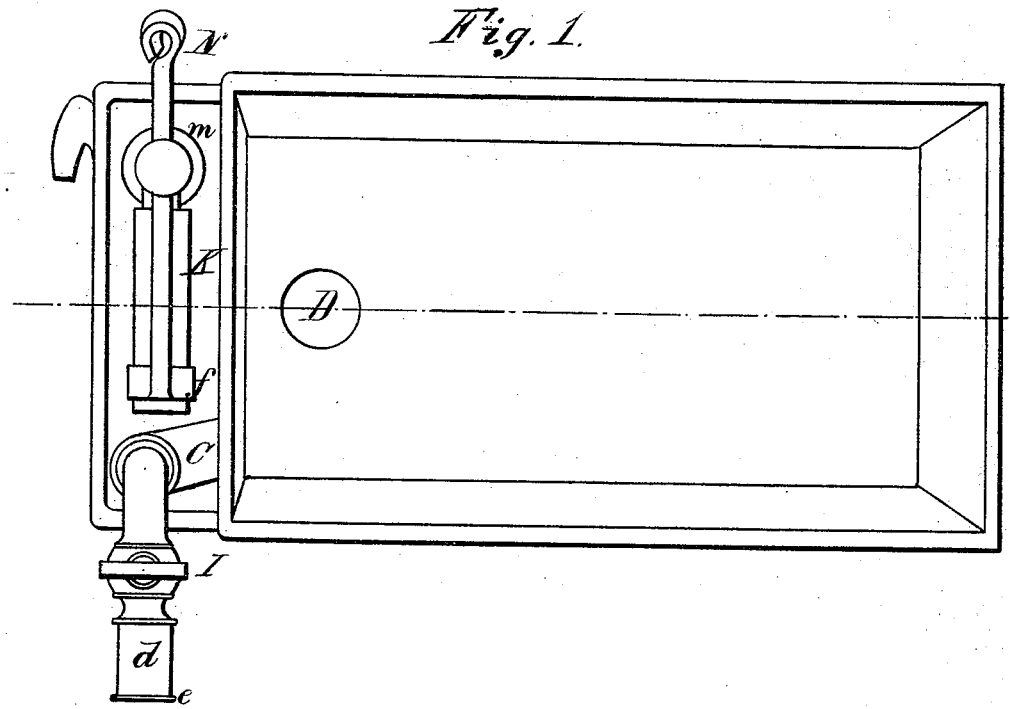
Figure 2:
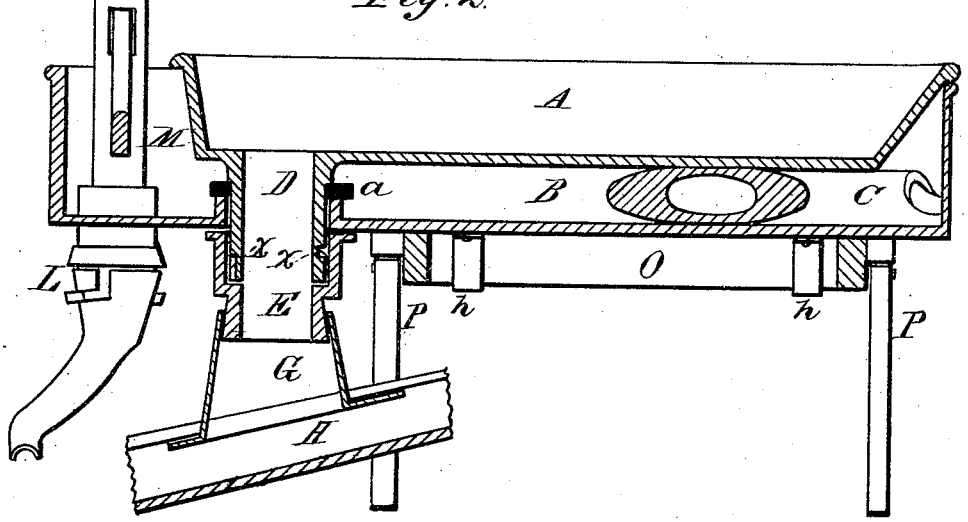

Figure 1 of the drawings is a representation of a plan view of my milk and cheese pans, and Fig. 2 is a longitudinal vertical sectional view thereof. Fig. 3 is a vertical transverse section across the end; and Figs. 4, 5, and 6 are detail views.

The nature of my invention consists in the construction and arrangement of a milk and cheese pan with vat, overflow-pipe, and connections, as will be hereinafter more fully set forth.

In the annexed drawings, A represents the pan for containing the milk or other material to be cooled or heated. B is the vat in which the pan rests, and in which the water or steam is admitted by pipe C for cooling or heating the pan. In the bottom of the pan A, at one end, is connected a nozzle, D, which is surrounded by a rubber gasket or washer, $a$, and extends down through the bottom of the vat B, and has upon its lower end a coupling, E. This coupling has two interior lugs, $b\ b$, which enter vertical grooves $x\ x$, made at the lower end in the outside of the nozzle, and have upwardly-inclined extensions $y\ y$, as shown. By thus fastening the coupling E—the lugs $b$ running upward into the grooves $y$—the bottom of the pan is drawn down, so that the rubber gasket $a$ will make a tight joint. On the lower end of the coupling E is a swiveled tube, G, having a sliding trough, H, on its lower end for carrying off the milk and the water used in cleaning the pan. I represents a stop-cock, used to form the connection between the supply-hose J and the induction-pipe C. This stop-cock or faucet has upon its end a metal tube or sleeve, $d$, soldered thereto, and the end of this sleeve has an outward-projecting circumferential flange, $e$, so that when the rubber hose J is drawn over the same it will form a perfectly-tight joint. The other end of the faucet is in like manner provided with a piece of rubber hose inserted in the end of the pipe C, to form tight connection therewith.

The water in the vat B passes out through a flexible overflow-pipe, K, which lies on the bottom of the vat, and is connected, by similar connections as described for the faucet, to the outlet-nozzle L, passing downward through the bottom of the vat, an intermediate pipe, M, being interposed between said nozzle and overflow-pipe, as shown in the drawing. This pipe M, with the overflow-pipe, is easily removed for emptying all the water out of the vat. The outer end of the overflow-pipe K is held in a tubular band or socket, $f$, formed on the end of a ratchet-lever, N, which passes through a slot in the upper end of the handle or pipe M, whereby the end of the overflow-pipe may be adjusted at any height desired, so as to regulate the height of the water in the vat. On the bottom of the vat B is fastened a frame, O, by means of bands or staples $h$, and to each end of this frame are pivoted two legs, P P, which have shoulders $i$ at their upper ends, said shoulders coming in contact with projecting portions $z$ of the side bars of the frame, to hold the legs firm when thrown down to support the vat and pan.

What I claim as new, and desire to secure by Letters Patent, is—

The open detachable and sliding trough H, in combination with the swiveled tube G and coupling E, for the purpose set forth.

In testimony that I claim the above I have hereunto subscribed my name in the presence of two witnesses.

GEORGE N. HORTON.

Witnesses:
L. D. STONE,
SEYMOUR S. HORTON.